US008493325B2

(12) United States Patent
See et al.

(10) Patent No.: US 8,493,325 B2
(45) Date of Patent: Jul. 23, 2013

(54) RECONFIGURABLE USER INPUT DEVICE FOR BOTH LEFT AND RIGHT HANDED USERS

(76) Inventors: Stephine Mak Pui See, Arlington Heights, IL (US); Donny Leung Chi Kit, Arlington Heights, IL (US)

( * ) Notice: Subject to any disclaimer, the term of this patent is extended or adjusted under 35 U.S.C. 154(b) by 989 days.

(21) Appl. No.: 12/090,939

(22) PCT Filed: Oct. 23, 2006

(86) PCT No.: PCT/US2006/041292
§ 371 (c)(1),
(2), (4) Date: Jul. 21, 2008

(87) PCT Pub. No.: WO2007/048043
PCT Pub. Date: Apr. 26, 2007

(65) Prior Publication Data
US 2008/0284731 A1    Nov. 20, 2008

Related U.S. Application Data

(60) Provisional application No. 60/728,843, filed on Oct. 21, 2005.

(51) Int. Cl.
*G09G 5/08*    (2006.01)
*G06F 3/033*    (2006.01)

(52) U.S. Cl.
USPC .............. 345/161; 345/156; 345/157; 463/36; 463/37; 463/38; 74/471 XY

(58) Field of Classification Search
USPC .............. 345/156–162, 168–169; 463/36–38, 463/46–47; 74/471 XY
See application file for complete search history.

(56) References Cited

U.S. PATENT DOCUMENTS

| 4,414,438 | A | * | 11/1983 | Maier et al. .................... 200/6 A |
| 4,491,325 | A | * | 1/1985 | Bersheim ......................... 463/38 |
| 4,969,647 | A | * | 11/1990 | Mical et al. ...................... 463/31 |
| 5,267,181 | A | * | 11/1993 | George .......................... 708/142 |
| 5,430,511 | A | * | 7/1995 | Paff et al. ....................... 396/427 |
| 5,624,117 | A | * | 4/1997 | Ohkubo et al. ............ 273/148 B |
| 5,781,180 | A | * | 7/1998 | Couch et al. ................... 345/161 |
| 5,785,317 | A | * | 7/1998 | Sasaki ......................... 273/148 B |
| 5,786,807 | A | * | 7/1998 | Couch et al. ................... 345/161 |
| 5,989,123 | A | * | 11/1999 | Tosaki et al. .................... 463/37 |

(Continued)

FOREIGN PATENT DOCUMENTS

| CA | 2460893 | 10/2004 |
| EP | 1524592 | 4/2005 |

(Continued)

*Primary Examiner* — Lun-Yi Lao
*Assistant Examiner* — Gene W Lee
(74) *Attorney, Agent, or Firm* — McAndrews, Held & Malloy

(57) ABSTRACT

A reconfigurable user input device for use with an electronic video apparatus, such as a video game console, educational console or computer suitable for use by both left and right handed users. The multifunction user device further includes a base housing, a first input device and a second input device separated by a rotatable arm member mounted upon the base housing. A rotation mechanism is affixed between the rotatable arm member and the base housing permitting the arm member to rotate about a center axis to, in turn, permit the first input device and second input device to be respectively located alternatively to the left side or the right side of the housing.

20 Claims, 6 Drawing Sheets

U.S. PATENT DOCUMENTS

| | | | |
|---|---|---|---|
| 6,033,309 A * | 3/2000 | Couch et al. | 463/38 |
| 6,059,660 A * | 5/2000 | Takada et al. | 463/38 |
| 6,147,673 A * | 11/2000 | Zarek | 345/156 |
| 6,149,523 A * | 11/2000 | Yamada et al. | 463/31 |
| 6,169,537 B1 * | 1/2001 | Taft | 345/163 |
| 6,262,715 B1 * | 7/2001 | Sawyer | 345/163 |
| 6,370,018 B1 * | 4/2002 | Miller et al. | 361/679.08 |
| 6,373,501 B1 * | 4/2002 | Fiero | 715/700 |
| 6,593,914 B1 * | 7/2003 | Nuovo et al. | 345/169 |
| 6,691,589 B2 * | 2/2004 | Gillman et al. | 74/471 XY |
| 6,756,969 B2 * | 6/2004 | Nuovo et al. | 345/169 |
| D508,052 S * | 8/2005 | Kit et al. | D14/413 |
| 7,030,868 B2 * | 4/2006 | Clapper | 345/204 |
| 7,109,972 B2 * | 9/2006 | Fu | 345/163 |
| 7,253,398 B2 * | 8/2007 | Hughes et al. | 250/239 |
| 7,726,692 B2 * | 6/2010 | Ozaki et al. | 280/778 |
| 2003/0193480 A1 * | 10/2003 | Nuovo et al. | 345/168 |
| 2004/0212597 A1 * | 10/2004 | Nuovo et al. | 345/168 |
| 2004/0223004 A1 * | 11/2004 | Lincke et al. | 345/649 |
| 2005/0030278 A1 * | 2/2005 | Fu | 345/156 |
| 2007/0054736 A1 * | 3/2007 | See | 463/37 |

FOREIGN PATENT DOCUMENTS

| | | |
|---|---|---|
| JP | 10187342 | 7/1998 |
| WO | 0247365 | 6/2002 |
| WO | 03021919 | 3/2003 |

\* cited by examiner

RECONFIGURABLE USER INPUT DEVICE FOR BOTH LEFT AND RIGHT HANDED USERS

BACKGROUND OF THE INVENTION

1. Field of the Invention

The present invention relates generally to user input devices intended for use with electronic devices such as educational and/or entertainment audio/video consoles, and/or personal computers, and specifically to a user input device which includes both a joystick device and a keypad, or pushbutton switch module in a single repositionable unit of the input device, wherein the joystick may be positioned on either the left side or right side of the overall input device, with the keypad being simultaneously repositioned on the opposing side of the overall input device, such that the input device is easily adaptable for use by both left handed and right handed users.

2. Background and the Prior Art

The increasing sophistication of microprocessor based electronic devices such as personal computers and video entertainment and game consoles, together with increasingly sophisticated software used with such devices, has created a demand for many different types of user input devices to control or otherwise interact with the software run by the microprocessor based system. Software such as a flight simulator program may optimally require use of both a joystick input device as well as a separate input device containing a plurality of buttons, such as a keypad comprising four orthogonally positioned pushbutton switches. Educational and entertainment software designed for children is increasingly optimized for use in connection with both joystick and pushbutton switch input devices. For example, a joystick device is ideal for use by a young child to control/manipulate a cursor on a video display screen where calibrations can be made for varying the degrees of a child's manual dexterity. It is also desirable to offer a child the simultaneous use of an input device comprising a group of pushbutton switches having alphanumeric or colored indicia thereon, to further interact with or provide responses or commands to the software. Indeed, in many cases, it is desirable to provide for multiple types of user input devices for simultaneous use during an entertainment or educational game session.

One prior art solution addressing the need for multiple user input devices was to merely provide separate stand-alone devices each independently connected to one or more input ports present on a console or personal computer. One disadvantage of such a prior art arrangement is the fact that by design the input devices are not affixed to one another and accordingly they may be difficult to position in an optimal manner or otherwise maintain in a desired position relative to one another. Moreover, during the course of game play rapid or exaggerated motions may cause one or the other of the input devices to tip over, separate, or otherwise interfere with the desired operation of the input devices and, in turn, the entertainment or educational value provided by the software. Various forms of combined user input devices exist in the prior art which include both a joystick as well as a keypad component. Such devices are typically contained within a single unitary housing which by design places the upright joystick controller to one side or the other of the keypad in a fixed arrangement. One example is illustrated in U.S. Pat. No. 6,429,849, FIG. 2. Another example is a typical game controller, such as the game controller for the Sony Playstation 2, wherein a joystick is permanently positioned on one side of the game controller, with a collection of pushbutton switches permanently positioned on the opposing side of the controller. In effect, the user is forced to use the joystick controller with one specific hand, and the pushbutton switches with the other, regardless of whether the user is left handed or right handed. As such, these devices are typically best suited for use by a right handed individual as opposed to a left handed individual, based upon the position of the joystick relative to the keypad. Such products do not provide for repositioning the joystick or otherwise altering the orientation of the two input devices with respect to one another. Accordingly, particularly in the context of young children, such inflexibility may frustrate the use of the input device and/or the benefits to be gained from the entertainment and/or educational features provided by the electronic console with which the input device is used.

One additional form of prior art is disclosed in U.S. Pat. No. 5,786,807 and U.S. Pat. No. 5,781,180 each of which disclose a convertible peripheral input device comprising a multi-axis input device such as a joystick used in combination with a control pad including a plurality of buttons. These particular prior art devices in fact, each comprise two separate stand-alone input units each with their own housings and independent wired connection to an external device. Each unit's housings are joined together by a hinge plate spanning and affixed to the bottom of each of the device housings using screws. While the overall device is convertible from right handed to left handed use, making such a conversion requires complete disassembly of the hinge plate, starting with removal of the screws, manipulation of the hinge plate and total reassembly and reinsertion of the screw fasteners. One obvious potential disadvantage is the potential for one or more of the screws or even the hinge plate to become lost or damaged, thereby defeating the intended utility of the device. Furthermore, such a prior art construction is not ideal for young children who will likely require the assistance of an adult to reconfigure the device from a right to a left handed mode, and the reverse.

Therefore, it is a characteristic of the present invention to provide a multi-function user input device suitable for use by both left and right handed users for use in association with an electronic console, where the user input device includes a plurality of input devices which may be readily repositioned with respect to the overall housing for the input device, while remaining connected to the overall housing.

It is another characteristic of the present invention to provide a rotation mechanism which serves to permit two input devices to exchange positions upon the body of an overall controller housing, from between two potential positions for each device.

It is still a further characteristic of the present invention to include a sensor which serves to detect the relative positions of the input devices with respect to the overall housing of the controller, to thereby signal to the associated electronic console the particular orientation of the input devices as configured by the user.

It is a further characteristic of the present invention to provide a plurality of user input devices permanently affixed to an overall housing assembly, thereby precluding damage to or loss of any components or parts thereof.

It is yet another characteristic of the present invention to provide an easy-to-use input device suitable for use by a child who can reconfigure the input device for left handed or right handed operation without parental or adult assistance.

These and other characteristics and features of the present invention will become apparent in view of the present specification, drawings, and claims.

SUMMARY OF THE INVENTION

The invention disclosed herein comprises an multi-function user input device for use with an electronic video apparatus, such as a video game console, educational console or personal computer suitable for use by both left and right handed users. The multi-function user input device further includes a base housing, and a plurality of input devices, including a first input device and a second input device, substantially mounted upon opposing ends of a rotatable member, which, in turn, is operably and rotatably coupled to the base housing. A rotation mechanism is provided and disposed between the rotatable member and the base housing, permitting the first and second user input devices to rotate about a center axis to, in turn, permit the first input device and the second input device to each be located alternatively to the left side or the right side of base housing, as desired. Accordingly, the present device may be readily adapted for use by both left handed and right handed users.

In the preferred embodiment of the present invention, the first input device comprises a multi-axis joystick which includes a substantially upright extending member which is moveable in at least the two axes 90 degrees apart, and preferably, in all other directions. The preferred embodiment of the present invention further includes a second input device which comprises a keypad including one or more user actuated input surfaces, such as a plurality of pushbutton switches. In other embodiments of the present invention, the first input device may comprise a trackball or a keypad likewise including one or more user actuated surfaces.

A rotation mechanism is provided, affixed to both the base housing and an arm of the rotatable member which, in turn, operably connects the first and second input devices of the rotatable member. The rotation mechanism comprises a substantially cylindrical, telescoping member having a first end, operably coupled to the base housing, and a second end, operably coupled to the arm of the rotatable member. When the telescoping member is in its fully retracted configuration, the arm is in a transverse orientation, relative to the base housing, and is seated within a elongated recess within the base housing. Moreover, when telescoping member is in its retracted configuration, the first and second input devices are substantially seated within associated apertures of the base housing.

When the telescoping member is in its fully expanded configuration, the rotatable member and, in turn, the first and second input devices and their connecting arm are all elevated above the upper surface of the base housing, and are no longer retained within their associated apertures and recess, respectively. In this expanded orientation, the telescoping member permits the first and second input devices, and their connecting arm, to be manually rotated in either a clockwise or counterclockwise direction, (depending upon whether the first input device was previously seated within a first or second aperture of the base housing, respectively) relative to the base housing, through 180 degrees of rotation, about the center axis of rotation of the telescoping member. This, in turn, permits the first input device to be manually repositioned from the left hand side to the right hand side of the base housing, while the second input device is simultaneously repositioned from the right hand side to the left hand side of the base housing. Following this 180 degree rotated configuration, the telescoping member is reconfigured from its fully expanded to its fully retracted configuration, seating the arm of the rotatable member within the recess of the base housing, seating the first input device within the aperture on the right hand side of the base housing, and seating the second input device within the aperture on the left hand side of the base housing.

A position sensor is associated the rotatable member, and serves to indicate to the electronic device to which the overall multi-function user input device is coupled the particular orientation of the first and second input devices (i.e., whether the first input device is on the left or right hand side of the base housing, and, in turn, whether the second input device is on the left or right hand side of the base housing). This, in turn, permits the logical operation of the particular type of each input device to be varied in association of the particular orientation of the device. For example, when a joystick is repositioned from the left to the right side of the base housing, up, down, left and right deflection of the joystick is reversed, relative to its prior orientation. Similar logical reversals occur whenever a trackball, or a keypad comprising four orthogonally positioned pushbutton switches, is moved from one physical position to the other, relative to the base housing.

In particular, the position sensor may comprise a switch, or an optical sensor, affixed to the interior portion of the telescoping member, whereby the switch or optical sensor is closed when the first input device is positioned on the left hand side of the base housing, and is open when the first input device is positioned on the left hand side of the base housing. Alternatively, two sensors may be employed, so as to determine, when a first sensor is closed, that the first input device is fully seated within the associated aperture on the left hand side of the base housing, and when the second sensor is closed, the first input device is fully seated within the associated aperture on the right hand side of the base housing. When neither sensor is closed, the condition wherein the movable member is in the process of rotation between its first and second positions, with neither input device seated within an aperture of the base housing, may be detected. The use of two sensors accordingly permits this additional condition of the multi-function user device to be determined and conveyed to the electronic video device to which the overall multi-function user input device is coupled.

The invention further includes a releasable locking mechanism associated with the rotation mechanism, serving to lock the arm of the rotatable member within the recess of the base housing, to, in turn, lock the first and second input devices within associated apertures of the base housing, whenever the telescoping member is in its retracted position. In particular, the locking mechanism includes a sliding key member, a portion of which extends through the body of the base housing. By sliding the key member from a first, locked position to a second, unlocked position, a spring biased portion of the telescoping member is freed from restraint, and the telescoping member extends from its retracted to its expanded configuration, and, in turn, raising the first and second input devices, together with their adjoining arm, above the base housing from their recessed positions within the apertures and recess of the base housing, respectively. Moreover, in the preferred embodiment, the telescoping member includes additional spring biasing which causes the arm and the input devices to rotate clockwise counterclockwise (depending upon whether the first input device was seated within the first or second aperture of the base housing) or upon expansion of the telescoping member. In the preferred embodiment, this initial rotation is approximately 45 degrees. The user may then manually complete the remaining 135 degrees of clockwise or counterclockwise rotation, until the arm, and the input devices, are again aligned along the transverse axis of the base housing. Once so oriented, the user may then press downward on the arm to compress the telescoping member. This in turn, reseats the arm within the recess of the base housing, and reseats each input device within the opposite aperture of the base housing, relative to its position before the 180 degree rotation. Upon reseating the arm and input devices within the base housing, the locking mechanism is again engaged, and the rotatable member is retained within the housing body.

The preferred embodiment of the present invention further includes a plurality of auxiliary user input devices, such as pushbutton switches, extending outwardly from the surface of the base housing. The present invention further includes one or more printed circuit cards, operably coupled to the first, second and auxiliary user input devices, for establishing an electronic representation of the operation of the user input devices, including the current position and/or movement of joysticks, directional and quantitative movement of trackballs, and the current position (i.e., depressed or released) of keypads and other pushbutton switches, as well as an electronic representation of the state of the position sensor(s), or otherwise conveying position and movement to an external device that makes such determinations. Moreover, the present invention further includes a data/signal cable, extending from an aperture of the base housing, and terminating in a connector attachable to a mating connector on the audio/video console, for carrying these electronic representations/signals. Alternatively, a wireless connection may be employed to transmit this data from the multi-function user input device to the audio/visual console.

DETAILED DESCRIPTION OF THE INVENTION

Figure 2:
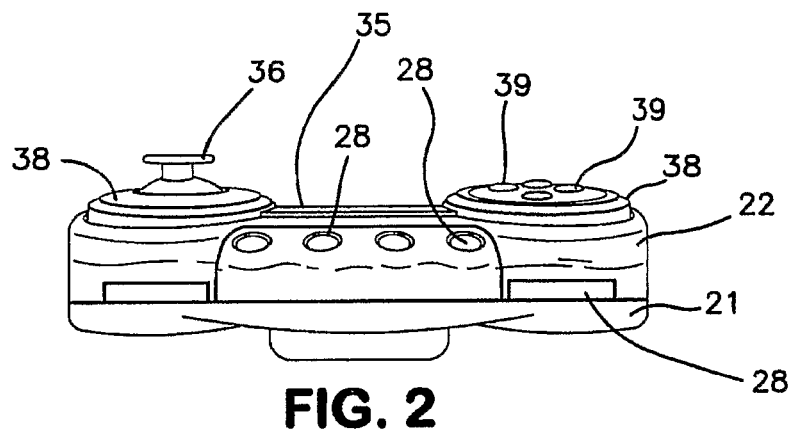
FIG. 2 of the drawings is a rear elevation view of the multi-function user input device, configured in the same manner as in FIG. 1.
Figure 1:
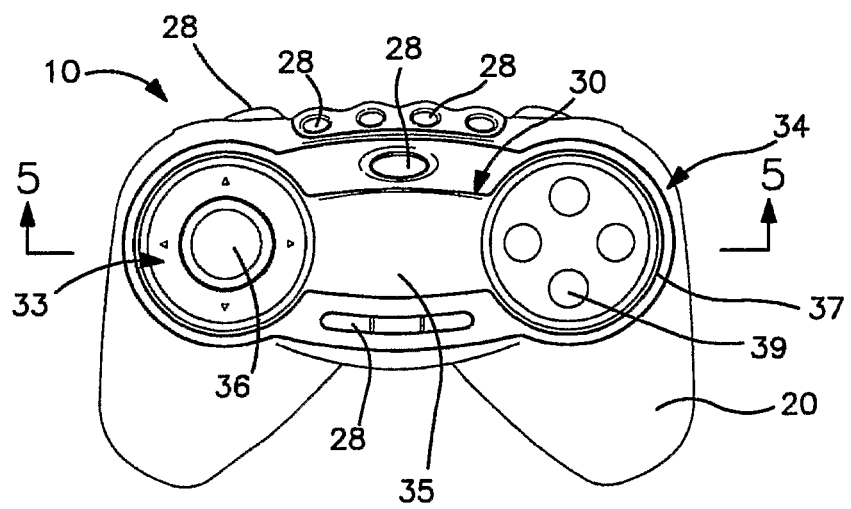
FIG. 1 of the drawings is a top plan view of the present multi-function user input device, specifically showing the joystick component positioned on the left side and the pushbutton switch assembly positioned on the right side of the overall device.
Figure 4:
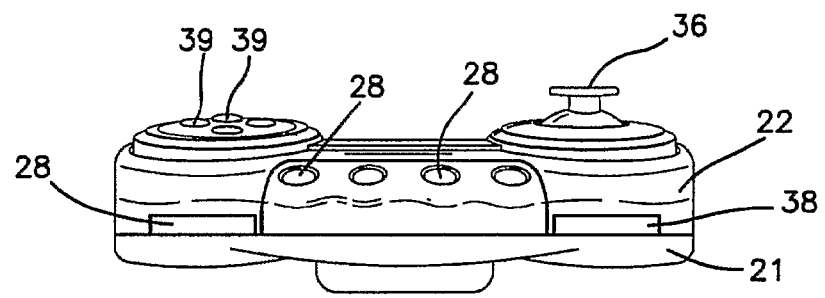
FIG. 4 of the drawings is a rear elevation view of the multi-function user input device, configured in the same manner as in FIG. 3.
Figure 3:
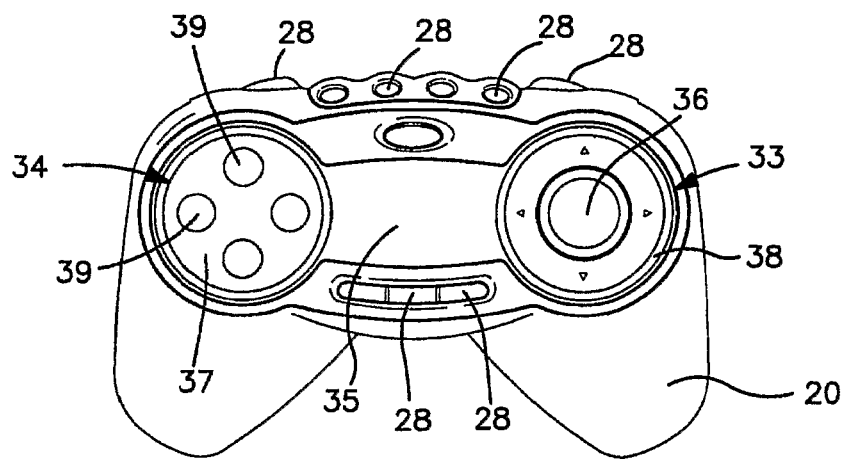
FIG. 3 of the drawings is a top plan view of the multi-function user input device, specifically showing the joystick component positioned on the right side and the pushbutton switch assembly positioned on the left side of the overall device.
Figure 6:
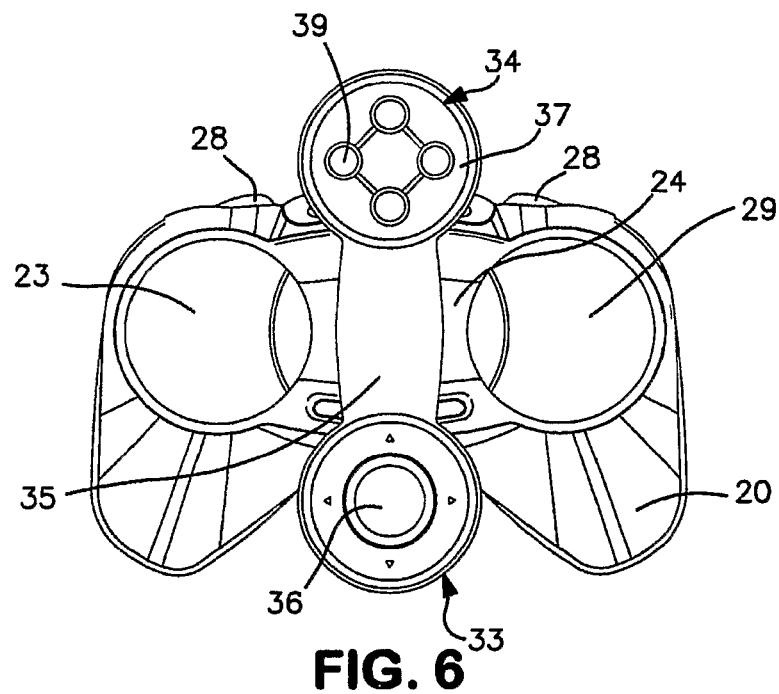
FIG. 6 of the drawings is a top plan view of the multi-function device showing, in particular, the joystick component and the pushbutton switch assembly midway between rotation from their first position to their second position.
Figure 5:
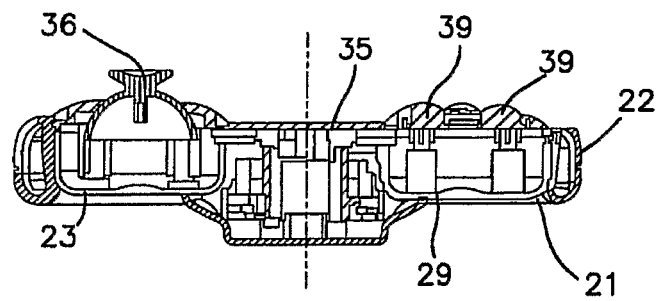
FIG. 5 of the drawings is a front sectional elevation view of the multi-function user input device, taken along lines 5-5 of FIG. 1.

While this invention is susceptible of embodiment in many different forms, there are shown in the drawings and will be described in detail, a specific embodiment of the present invention, with the understanding that the present disclosure is to be considered as an exemplification of the principles of the present invention and is not intended to limit the invention to the embodiment illustrated.

Multi-function user input device 10 is shown in FIGS. 1-10 as comprising base housing 20, rotatable member 30, and rotation mechanism 50. Base housing 20 comprises bottom shell 21, top shell 22, first aperture 23 extending through the top and bottom shells, and second aperture 29, likewise extending through the top and bottom shells. Elongated recess 24 is disposed on the upper surface of top shell 22, between first aperture 23 and second aperture 29. A plurality of position pushbutton switches 28 are disposed at fixed positions upon the upper surface of top shell 22, as well as the rear surface of base housing 20.

Rotatable member 30 comprises first user input device 33, second user input device 34, and arm 35, joining the first and second user input devices. In the preferred embodiment, first user input device 33 comprises joystick 36, and second user input device comprises keypad 37, including four orthogonally positioned pushbutton switches 39. Decorative rings 38 may optionally be attached to the first and second user input devices.

Figure 7:
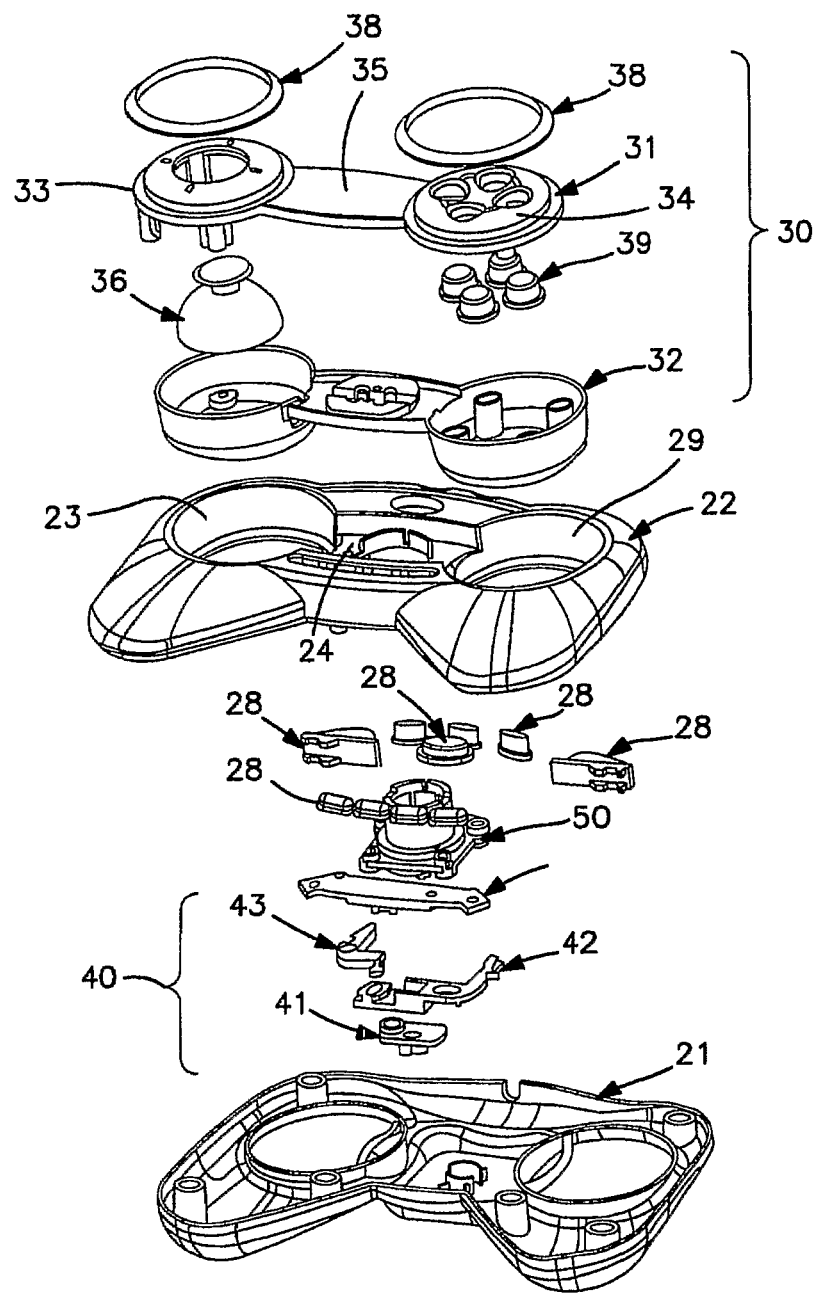
FIG. 7 of the drawings is an exploded perspective elevation view of the present multi-function user input device.

As shown in FIG. 7, rotatable member 30 includes a housing constructed of top shell 31 and bottom shell 32, with each shell forming a portion of the user input devices and the adjoining arm. User input devices 33, 34 are both substantially cylindrical in shape. Arm 35, disposed between and joining the user input devices, has substantially planar outer surfaces. Printed circuit cards (not shown) are associated with the first and second user input devices, and contain contacts, for sensing the positioning of the user input devices. In particular, a printed circuit card within the first user input device contains four contacts, each electrically closeable by an associated conductor disposed on the bottom surface of joystick 36, and enabling the user input device to sense when the joystick is vertical (no contact closure), has been deflected substantially in the up, down, left or right directions (each indicated by one particular contact closure), or has been deflected to orientations of approximately 45, 135, 225, or 315 degrees (each indicated by the closure of an adjoining pair of contacts). A printed circuit card within the second user input device contains four contacts, each closeable by an associated conductor disposed on the bottom surface of an associated pushbutton switch 39 of keypad 37, positioned above each conductor.

As shown in FIG. 7, the present multi-function user input device further includes a rotation mechanism comprising substantially cylindrical, telescoping member 50, disposed between rotatable member 30 and a central portion of base housing 20, permitting first user input device 33 and second user input device 34, as well as arm 35, to collectively rotate about a vertical center axis to, in turn, permit the first input device and the second input device to each be located alternatively within either first aperture 23 or second aperture 29 of base housing 20.

Telescoping member 50 includes a top end, operably attached to arm 35 of rotatable member 30, and a lower end, operably attached to base housing 21. Telescoping member is configurable between a collapsed configuration and an expanded configuration. When in the collapsed configuration, arm 35 of rotatable member 30 is seated within recess 24 of base housing 20, and, depending upon the rotational orientation of rotatable member 30, first user input device 33 is seated within one of first aperture 23 and second aperture 24 of base housing 20, and second user input device is seated within the other of these first and second apertures.

When telescoping member 50 is in its expanded configuration, rotatable member 30 is raised above the upper surface of base housing 30, with arm 35 no longer within recess 24, and the first and second input devices no longer seated within associated apertures of the base housing. Moreover, when telescoping member 50 is in its expanded configuration, telescoping member 50 permits 180 degrees of rotation of rotatable member 30, enabling rotatable member 30 to be manually repositioned such that each user input device aligns with either of the apertures of base housing 20. In other words, if first user input device 33 was previously seated within first aperture 23, telescoping member 50 permits rotatable member 30 to be rotated 180 degrees counterclockwise, until first user input device is positioned over second aperture 29 and second user input device 34 is positioned over first aperture 23. If first user input device was previously seated within second aperture 29, telescoping member 50 permits rotatable member 30 to be rotated 180 degrees clockwise, until first user input device is positioned over first aperture 23, and second user input device 34 is positioned over second aperture 29.

Whenever first user input device 33 is rotated so as to be vertically aligned with one of first aperture 23 and second aperture 29, with second user input device 34 likewise vertically aligned over the other aperture of base housing 20, telescoping member 50 may be manually compressed back to its fully compressed configuration. This, in turn, causes arm 35 to become reseated within recess 24, and both cylindrical user input devices to become seated within their respective aligned apertures. In this manner, through rotation of the telescoping member and, in turn, the rotatable member, the present multi-function user input device may be reconfigured as desired for both left and right handed operation, or to suit the particular preferences of the user. Although, in the preferred embodiment, a spring biased telescoping member is facilitated to permit rotation of the rotatable member and, in turn, positioning of the first and second user input devices, other rotation mechanisms may be employed without departing from the scope of the present invention.

Figure 8:
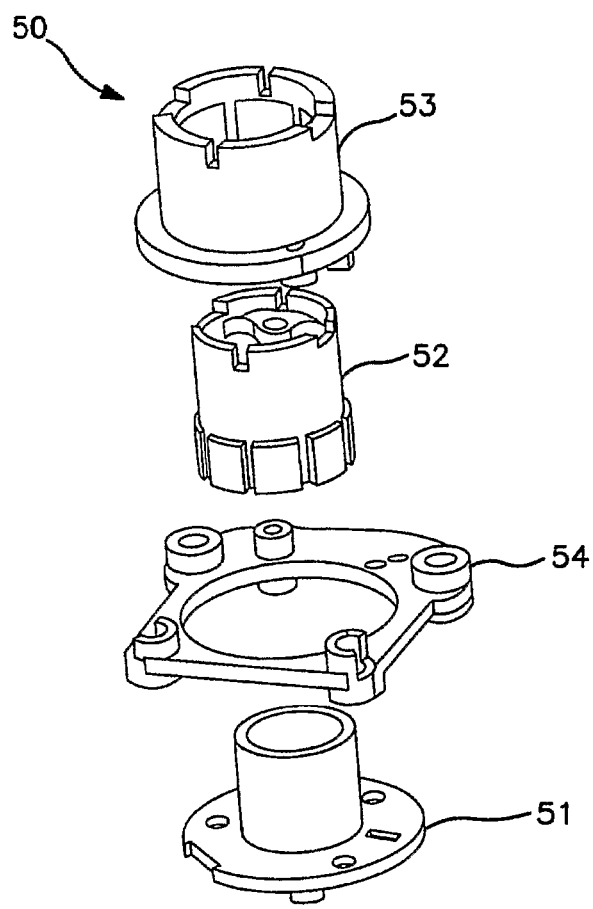
FIG. 8 of the drawings is an exploded perspective elevation view of the telescoping rotatable assembly.
Figure 9:
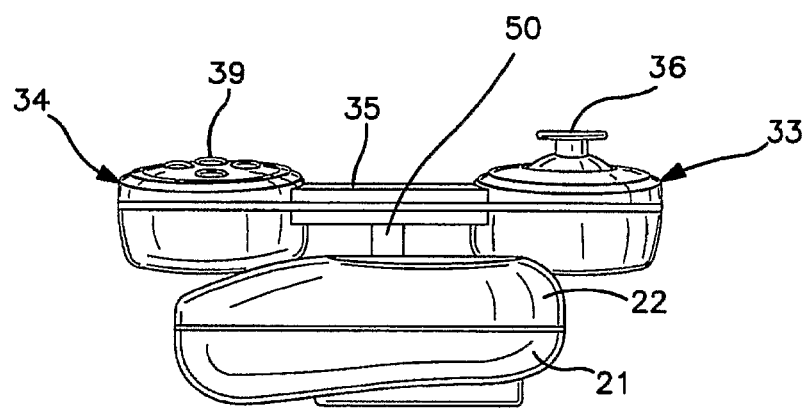
FIG. 9 of the drawings is a right side elevational view of multi-function user input device, showing, in particular, the joystick component and the pushbutton switch assembly midway between rotation from their first position to their second position.
Figure 10:
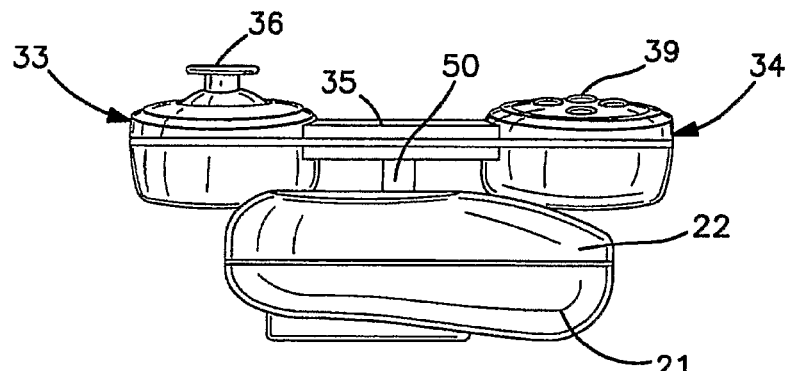
FIG. 10 of the drawings is a left side elevational view of multi-function user input device, showing, in particular, the joystick component and the pushbutton switch assembly midway between rotation from their first position to their second position.

As shown in FIG. 8, telescoping member 50 is comprised of first cylindrical member 51, second cylindrical member 52, third cylindrical member 54, and bracket 54. Moreover, telescoping member 50 is preferably spring biased, such that, when unlocked and released from its compressed configuration, telescoping member 50 automatically expands to its fully expanded configuration. Additional spring biasing is also preferably applied to telescoping member 50, such that, when unlocked and released from its compressed configuration, telescoping member 50 and, in turn, rotatable member 30, rotates an initial approximately 45 degrees of the 180 degree required rotation to reposition the rotatable member to the opposing orientation, relative to its prior, seated orientation.

As shown in FIG. 7, the present multi-function user input device further releasable locking mechanism 40 associated with telescoping member 50 and carried within base housing 20. Locking mechanism 40 serves to releasably restrain telescoping member 40 in its compressed configuration and, in turn, lock first input device 33 and second input device 34 within associated apertures of base housing 20, and to lock arm 35 of rotatable member 30 within recess 24 of base housing 20. As shown in FIG. 7, locking mechanism 40 comprises sliding key member 41, lift lock member 43, right lock member 42, and lock bracket 44. A portion of sliding key member 41 extends through an associated aperture through bottom shell 21 of base housing 20. By manually sliding key member 41 from a first, locked position to a second, unlocked position, operation of the remainder of locking mechanism 40 causes a spring biased portion of telescoping member 50 to be freed from restraint, with telescoping member 50 extending from its retracted to its expanded configuration, and, in turn, raising the first and second input devices, together with adjoining arm 35, above the base housing from their recessed positions within the apertures and recess of the base housing, respectively.

Whenever the first and second user input devices and arm 35 are manually reseated within apertures 23, 29 and recess 24, respectively, thereby compressing telescoping member 50, locking mechanism 40 is engaged, and again locks telescoping member 50 in its compressed configuration, until sliding key member 41 is again operated by the user.

The foregoing description and drawings merely explain and illustrate the invention, and the invention is not limited thereto, except insofar as the appended claims are so limited as those skilled in the art having the present disclosure before them will be able to make modifications and variations therein without departing from the scope of the invention.

What is claimed is:

1. A multi-function user input apparatus for use with an electronic video apparatus, the multi-function user input apparatus comprising:
    a base housing having a left side and a right side;
    a rotatable member rotatably mounted to the base housing, the rotatable member having a first user input device, a second user input device and a central axis; and
    a rotation mechanism associated with the rotatable member and the base housing, the rotation mechanism permitting the first and second input devices to be rotated substantially 180 degrees about the central axis, to, in turn, permit the first input device to be located alternatively proximate the left side or the right side of the base housing, with the second user input device on an opposing side of the base housing;
    wherein the first user input device is configured to generate first signals indicative of received user input;
    wherein the second user input device is configured to generate second signals indicative of received user input;
    wherein the rotation mechanism comprises a telescopic assembly positionable alternatively between an extended and a retracted position which when in an extended position permits rotation of the arm member and, in turn, repositioning of the first input device and second input device; and
    wherein the telescopic assembly is spring biased and further incorporates a locking mechanism to retain the rotation mechanism in a retracted position relative to base housing.

2. The multi-function user input apparatus of claim 1 wherein the first input device comprises a multi-axis joystick configured to generate the first signal based upon directional deflection of the multi-axis joystick in relation to a base of the first input device.

3. The multi-function user input apparatus of claim 1 wherein:
    the first input device comprises a keypad including one or more user activated input surfaces in an arrangement to receive directional user input; and
    the keypad is configured to generate the first signal based upon the received directional user input.

4. The multi-function user input apparatus of claim 1 wherein the second input device comprises a multi-axis joystick configured to generate the second signal based upon directional deflection of the multi-axis joystick in relation to a base of the second input device.

5. The multi-function user input apparatus of claim 1, wherein:
    the second input device comprises a keypad including one or more user activated input surfaces in an arrangement to receive directional user input; and the keypad is configured to generate the second signal based upon the received directional user input.

6. The multi-function user input apparatus of claim 1 further including a position sensor associated with one of the first input device, second input device and the arm member indicating to the electronic video apparatus the orientation of the first input device with respect to the second input device.

7. The multi-function user input apparatus of claim 1 wherein the base housing incorporates a recess for accepting receipt of the rotatable member when fully rotated to one or more of its normal operating positions and the rotation mechanism is in a fully retracted position.

8. The multi-function user input apparatus of claim 1 wherein the rotatable member is rotatable and lockable into one of two normal operating positions positioned 180 degrees apart.

9. A multi-function user input apparatus for use with an electronic video apparatus, the multi-function user input apparatus comprising:
a base housing;
a first input device and a second input device joined to one another by a rotatable arm member; and
a rotation mechanism operably attached to the base housing and to the arm member, permitting the arm member and, in turn, the first and second input devices to be rotated substantially 180 degrees about a central axis, to further, in turn, permit the first input device to be located alternatively to the left side or the right side of the base housing, with the second user input device on an opposing side of the base housing; wherein the first user input device is configured to generate first signals indicative of received input;
wherein the second user input device is configured to generate second signals indicative of received input;
wherein the rotation mechanism comprises a telescopic assembly positionable alternatively between an extended and a retracted position which when in an extended position permits rotation of the arm member and, in turn, repositioning of the first input device relative to the second input device; and
wherein the telescopic assembly is spring biased and further incorporates a locking mechanism to retain the rotation mechanism in a retracted position relative to base housing.

10. The multi-function user input apparatus of claim 9 wherein the first input device comprises a multi-axis joystick.

11. The multi-function user input apparatus of claim 9 wherein the first input device comprises a keypad including one or more user activated input surfaces.

12. The multi-function user input apparatus of claim 9 wherein the second input device comprises a multi-axis joystick.

13. The multi-function user input apparatus of claim 9 wherein the second input device comprises a keypad including one or more user activated input surfaces.

14. The multi-function user input apparatus of claim 9 further including a position sensor associated with one of the first input device, second input device and the arm member indicating to the electronic video apparatus the orientation of the first input device with respect to the second input device.

15. The multi-function user input apparatus of claim 9 wherein the base housing incorporates a recess for accepting receipt of the first input device, second input device and the arm member when the arm member is fully rotated to one or more of its normal operating positions and the rotation mechanism is in a fully retracted position.

16. The multi-function user input apparatus of claim 9 wherein the arm member is lockable into one of two normal operating positions positioned 180 degrees apart.

17. A two-handed user input apparatus, comprising: a base housing comprising a left side configured to be held by a user's left hand and a right side configured to be held by a user's right hand;
a rotatable member comprising a first end and a second end;
a first user input device positioned toward a first end of the rotatable member;
a second user input device positioned toward a second end of the rotatable member; and
a rotation mechanism configured to rotatably mount the rotatable member to the base housing,
wherein the rotation mechanism permits rotation of the rotatable member with respect to the base housing to a first position that positions the first user input device proximate the left side of the base housing for actuation by the user's left hand and that positions the second user input device proximate the right side of the base housing for actuation by the user's right hand; and
wherein the rotatable member permits rotation of the rotatable member with respect to the base housing to a second position that positions the first user input device proximate the right side of the base housing for actuation by the user's right hand and that positions the second user input device proximate the left side of the base housing for actuation by the user's left hand.

18. The two-handed user input apparatus of claim 17, wherein the rotation mechanism comprises a telescopic assembly positionable between a retracted position and an extended position that permits rotation of the rotatable member between the first position and the second position.

19. The two-handed user input apparatus of claim 18, wherein the telescopic assembly comprises a spring configured to bias the rotation mechanism toward the extended position and a locking mechanism configured to retain the rotation mechanism in the retracted position.

20. The two-handed user input apparatus of claim 17, further comprising a position sensor configured to detect whether the first user input device is proximate the left side of the base housing.

* * * * *